United States Patent [19]

Yamauchi

[11] 4,396,875

[45] Aug. 2, 1983

[54] DC MOTOR

[75] Inventor: Hiroyuki Yamauchi, Tokyo, Japan

[73] Assignee: Sony Corporation, Tokyo, Japan

[21] Appl. No.: 137,412

[22] Filed: Apr. 4, 1980

[30] Foreign Application Priority Data

Apr. 5, 1979 [JP] Japan .................................. 54/41328

[51] Int. Cl.³ ............................................ H02K 21/00
[52] U.S. Cl. .................................... 318/254; 318/138
[58] Field of Search .................... 318/138, 254, 254 A, 318/439; 310/68 R, 68 D, 130, 148, 268

[56] References Cited

U.S. PATENT DOCUMENTS

| 3,440,506 | 4/1969 | Krestel et al. | 318/254 A |
| 3,959,705 | 5/1976 | Salihi | 318/439 |
| 4,015,181 | 3/1977 | Karube et al. | 318/439 |
| 4,096,419 | 6/1978 | Wren et al. | 318/254 A |
| 4,242,608 | 12/1980 | Ishigaki et al. | 318/254 A |

Primary Examiner—David Smith, Jr.
Attorney, Agent, or Firm—Lewis H. Eslinger; Alvin Sinderbrand

[57] ABSTRACT

A DC motor comprises a stator, a rotor adapted to rotate about an axis with respect to the stator, two coil windings mounted on one of the stator and rotor and separated by an electrical angle of N×90° where N is an odd integer, a permanent magnet having a plurality of pairs of magnetic pole pieces of opposite polarity mounted on the other of the stator and rotor, a position magnet mounted on one of the stator and rotor for generating a sinusoidal magnetic flux signal, a magnetic reluctance element mounted on the other of the stator and rotor for detecting the sinusoidal magnetic flux signal and generating a control signal proportional to $\sin^2\theta$ in response thereto where $\theta$ is an angle corresponding to the rotational position of the rotor, first and second amplifiers for producing drive signals proportional to $\sin^2\theta$ and $\cos^2\theta$, respectively, in response to the control signal, and a switching device for energizing one of the two windings with the drive signal proportional to $\sin^2\theta$ and for energizing the other of the two windings with the drive signal proportional to $\cos^2\theta$ with the direction of current flow through the two windings being periodically alternated in correspondence with the rotational position of the rotor so as to rotate the rotor about its axis.

19 Claims, 21 Drawing Figures

DC MOTOR

BACKGROUND OF THE INVENTION

1. Field of the Invention

This invention relates generally to DC motors and, more particularly, is directed to an improved circuit for driving a DC motor.

2. Description of the Prior Art

Various types of brushless DC motors are known, such motors generally including at least one pair of magnetic poles, usually formed of permanent magnet north and south pole pieces, secured to either the rotor (brushless type) or the stator (commutator type) and corresponding energizable coils mounted on the other of the stator (brushless type) or the rotor (commutator type) with each coil having conductor segments for carrying current in directions which are normal to the magnetic flux generated by the permanent magnet pole pieces. With such an arrangement, the rotor is caused to rotate relative to the stator by a torque produced by the interaction of magnetic flux generated by the pole pieces and the current flow through the coils with the direction of rotation being perpendicular both to the direction of magnetic flux and the direction of current flow.

Known brushless DC motors of the above type are shown, for example, in U.S. Pat. Nos. 3,383,574 and 3,517,289. In such DC motors, two coil windings are displaced from one another by an electrical angle of 90°. In order to provide energization of the coils, two position sensing devices, such as two Hall-effect elements, detect the rotational position of the rotor with respect to the stator and produce sinusoidal drive signals which are used to alternately energize the windings for rotating the rotor with a substantially constant torque regardless of the rotational position of the rotor. In particular, one Hall-effect element produces a drive current signal proportional to sin $\theta$ for energizing one of the windings and the other Hall-effect element produces a drive current signal proportional to cos $\theta$ for energizing the other winding.

However, because of such arrangement, positive and negative polarity power sources are required for operating the DC motor. Also, since two Hall-effect elements are used, there may be fluctuation in the DC level between the two drive current signals, resulting in a torque having undesirable ripple. In addition, there may be a problem with electrical noise in such DC motors, particularly during switching in DC motors of the commutator type.

OBJECTS AND SUMMARY OF THE INVENTION

Accordingly, it is an object of this invention to provide a DC motor that avoids the above-described difficulties encountered with the prior art.

More particularly, it is an object of this invention to provide a DC motor which energizes the windings thereof in response to drive signals proportional to sin$^2$ $\theta$ and cos$^2$ $\theta$ with the direction of current through the windings being alternated in correspondence with the rotational position of the rotor.

Another object of this invention is to provide a DC motor in which the direction of current flowing through the windings is periodically switched when such current is approximately equal to zero so as to substantially eliminate electrical noise normally resulting during such switching operation.

Still another object of this invention is to provide a DC motor having a single position sensing device for generating a signal used for energizing the coils whereby a substantially constant torque with no ripple is produced regardless of the rotational position of the rotor.

Yet another object of this invention is to provide a DC motor which has only a single power source for operating the motor.

A further object of this invention is to provide a DC motor which is of relatively simple construction and operation.

In accordance with an aspect of this invention, a DC motor is provided including a stator, a rotor adapted to rotate about an axis with respect to the stator, at least two windings included in one of the stator and rotor, at least one pair of permanent magnet poles of opposite polarity included in the other of the stator and rotor, means for producing drive signals proportional to sin$^2$ $\theta$ and cos$^2$ $\theta$, respectively, where $\theta$ is an angle corresponding to the rotational position of the rotor, and means for energizing the at least two windings in response to the drive signals with the direction of current through the at least two windings being alternated in correspondence with the rotational position of the rotor so as to rotate the rotor about the axis.

The above, and other, objects, features and advantages of the invention, will be apparent in the following detailed description of illustrative embodiments of the invention which is to be read in connection with the accompanying drawings.

DETAILED DESCRIPTION OF THE PREFERRED EMBODIMENTS

Figure 2:
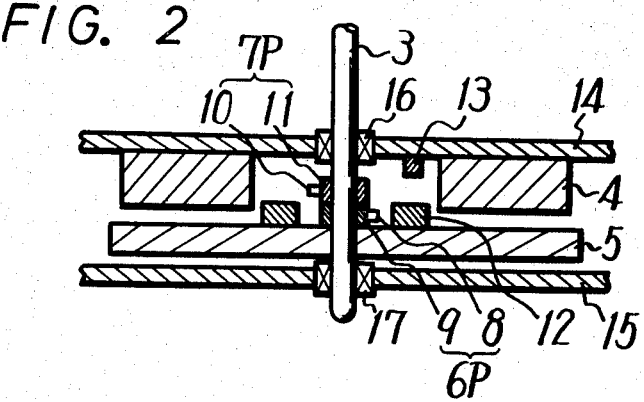
FIG. 2 is a schematic cross-sectional view of a DC motor of the commutator type according to this invention.
Figure 3:
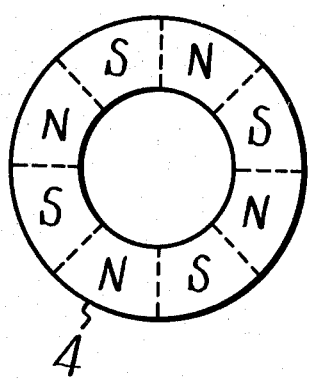
FIG. 3 is a schematic plan view of one embodiment of an annular permanent magnet that can be used with the DC motor of FIG. 2.

Referring to the drawings in detail and initially to FIG. 2 thereof, there is shown a DC motor of the commutator type with which the present invention finds ready application. The DC motor of FIG. 2 is an 8-pole 2-phase DC motor having a non-rotatable stator comprised of stator yokes 14 and 15 of magnetic material. Secured to a surface of stator yoke 14 is an annular permanent magnet 4 (FIG. 3) which is magnetized so as to have four pairs of permanent magnet pole pieces of opposite polarity. That is, each pair of permanent magnetic pole pieces is constituted by a north magnet pole piece and a south pole piece with each pole piece occupying an electrical angle of 180°. For the purpose of this and the following description, a "positional" angle is a geometric angle between two points on the rotor or stator and an "electrical" angle is equal to the "positional" angle multiplied by the number of pairs of poles.

Figure 4:
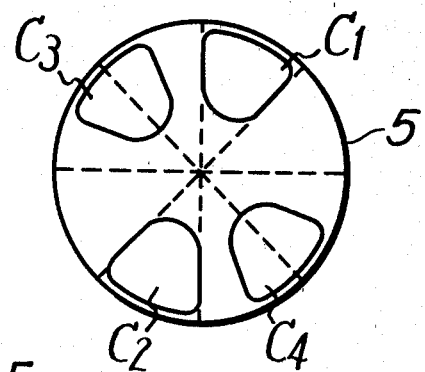
FIG. 4 is a schematic plan view illustrating one arrangement for the two-phase drive windings used in the DC rotor of FIG. 2.

The DC motor further includes a rotor 5 fixed to a rotatable shaft 3, the latter being rotatably supported in the stator by bearings 16 and 17 mounted in stator yokes 14 and 15, respectively. Symmetrically secured to a surface of rotor 5 in facing relation to the pole pieces are first and second drive windings constituted by coils $C_1$, $C_2$ and $C_3$, $C_4$, respectively (FIG. 4). Coils $C_1$ and $C_2$ are arranged in diametrically opposed relation on the surface of rotor 5 so as to be spaced apart from each other by a positional angle of 180°. That is, the central portion of coil $C_1$ is positioned 180° from the central portion of coil $C_2$. Coils $C_3$ and $C_4$ are likewise diametrically arranged on rotor 5. Further, coils $C_1$ and $C_2$ are connected in series with each other and both coils are electrically in phase. Coils $C_3$ and $C_4$ are also connected in series and are electrically in phase. As shown in FIG. 4, the coils $C_1$, $C_2$, $C_3$ and $C_4$ are spaced apart from each other by an electrical angle of $N \times 90°$ where N is an odd integer. Thus, if the magnetic flux distribution of permanent magnet 4 changes as a square wave along a circumferential path of magnet 4, the changing magnetic flux distribution seen by first and second drive windings $C_1$, $C_2$ and $C_3$, $C_4$ is out of phase by an electrical angle of 90°, as shown by waveform diagrams 1 and 2 of FIGS. 1A and 1B, respectively.

Figure 5:
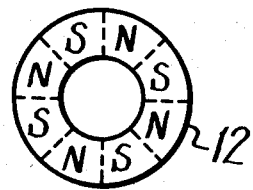
FIG. 5 is a schematic plan view of a position magnet that can be used with the DC motor of FIG. 2.

In accordance with an aspect of this invention, the energizing currents supplied to windings $C_1$, $C_2$ and $C_3$, $C_4$ are energized in response to drive signals proportional to $\sin^2 \theta$ and $\cos^2 \theta$, respectively, with the direction of the energizing currents being alternated in response to the rotational position of rotor 5. For this purpose, the DC motor of FIG. 2 further includes an annular position magnet 12 (FIG. 5) secured to rotor 5. Position magnet 12 is magnetized to have the same number of pole pieces as that of permanent magnet 4, that is, 8 pole pieces, and generates a magnetic flux of sinusoidal waveform along a circumferential path therearound. The DC motor of FIG. 2 further includes a magnetic reluctance element 13 secured to stator yoke 14 which detects the magnetic flux generated by position magnet 12 when the latter is rotated with rotor 5. Magnetic reluctance element 13 produces a signal proportional to the square of the magnetic flux distribution from position magnet 12. Thus, if the changing magnetic flux distribution from position magnet 12, as rotor 5 rotates, is expressed as B sin $\theta$, magnetic reluctance element 13 produces a control signal proportional to $\sin^2 \theta$. It is to be noted that the same result may be obtained if position magnet 12 is secured to stator yoke 14 and magnetic reluctance element 13 is secured to rotor 5.

It should be appreciated that, in order to generate a substantially constant torque for the motor, two drive currents proportional to $\sin^2 \theta$ and $\cos^2 \theta$ are required for driving windings $C_1$, $C_2$ and $C_3$, $C_4$, respectively, in view of the electrical angle separation therebetween of $N \times 90°$ where N is an odd integer. That is, when a current proportional to $\sin^2 \theta$ is supplied to drive winding $C_1$, $C_2$, a torque $T_s$ generated by the interaction of the current flow through the winding and the magnetic flux generated by the pole pieces can be expressed by the following equation:

$$T_s = B \times K \sin^2 \theta \qquad (1)$$

where B is the magnetic flux generated by the pole pieces and K is a constant. In like manner, when an energizing current proportional to $\cos^2 \theta$ is supplied to the other drive winding $C_3$, $C_4$, a torque $T_c$ generated by the interaction of the current flow through the winding and the magnetic flux generated by the pole pieces can be expressed by the following equation:

$$T_c = B \times K \cos^2 \theta \qquad (2)$$

The composite torque T as a result of the interaction of the magnetic flux generated by the pole pieces and the current flow through both windings $C_1$, $C_2$ and $C_3$, $C_4$, can thus be expressed as:

$$T = T_s + T_c = B \times K(\sin^2 \theta + \cos^2 \theta) = B \times K \qquad (3)$$

It should thus be appreciated that when currents proportional to $\sin^2 \theta$ and $\cos^2 \theta$ are supplied to windings $C_1$, $C_2$ and $C_3$, $C_4$, respectively, a substantially constant rotational torque with no ripple is produced regardless of the rotational position of rotor 5.

Figure 6:
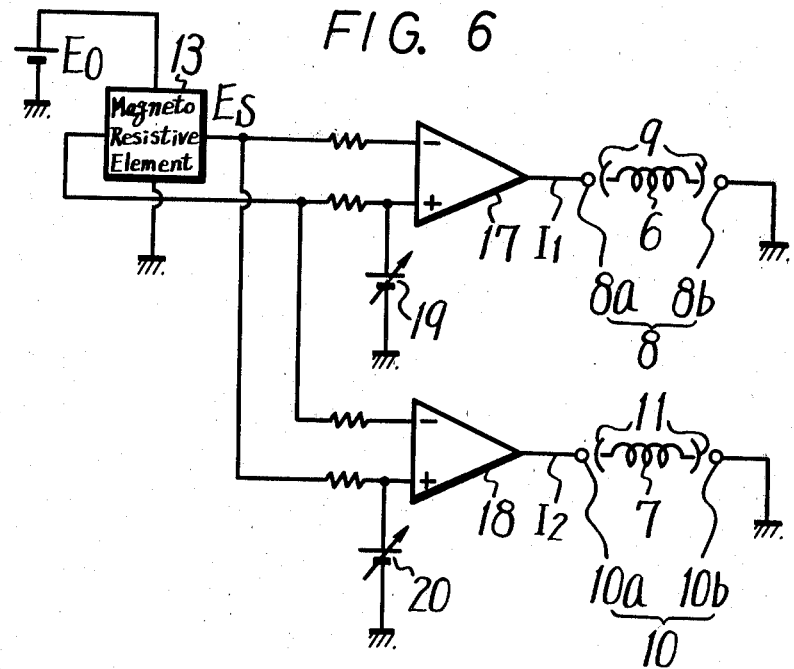
FIG. 6 is a circuit wiring-block diagram of a drive circuit for driving the DC motor of FIG. 2.

Referring now to FIG. 6, there is shown a drive circuit for energizing the windings of the DC motor of FIG. 2 in response to drive signals proportional to $\sin^2 \theta$ and $\cos^2 \theta$, respectively. In FIG. 6, windings $C_1$, $C_2$ and $C_3$, $C_4$ are respectively indicated at 6 and 7, and magnetic reluctance element 13 is shown to be supplied with a DC current from a DC voltage source $E_0$ and assumed to be subjected to the magnetic flux B sin $\theta$ from position magnet 12 (not shown). In response thereto, magnetic reluctance element 13 produces a control signal $E_s$ proportional to $\sin^2 \theta$, this signal being supplied to an operational amplifier 17 which produces a drive current signal $I_1$ proportional to $\sin^2 \theta$ and to be used for energizing drive winding 6.

In order to energize drive winding 7, a drive current signal proportional to $\cos^2 \theta$ must be generated. This may be accomplished by providing a second magnetic reluctance element spaced from magnetic reluctance element 13 by an electrical angle of $N \times 90°$ where N is an odd integer. However, the use of two magnetic reluctance elements may be disadvantageous for the reason that the DC levels of the signals produced by the two magnetic reluctance elements may differ, resulting in the production of a torque having undesirable ripple. Therefore, the drive circuit of FIG. 6 uses a single magnetic reluctance element 13 with control signal $E_s$ therefrom being inverted and supplied to a second operational amplifier 18. More particularly, control signal $E_s$ has its polarity inverted by being supplied to operational amplifier 18 at the reverse inputs thereof from those of operational amplifier 17 so as to supply a signal proportional to $-\sin^2 \theta$ to the inputs of operational amplifier 18. Further, the inverted output signal from magnetic reluctance element 13 has its DC level shifted by a DC voltage source 20 connected between the non-inverting input of operational amplifier 18 and ground. It should be appreciated that operational amplifier 18 thereby produces an energizing current $I_2$ proportional to $\cos^2 \theta$ and which is used to energize drive winding 7. That is, by using the relationship $\cos^2 \theta = 1 - \sin^2 \theta$, current $I_2$ proportional to $\cos^2 \theta$ is produced from output signal $E_s$ which is proportional to $\sin^2 \theta$. A DC voltage source 19 is further connected between the non-inverting input of operational amplifier 17 and ground and, along with DC voltage source 20, acts to remove a DC offset introduced by magnetic reluctance element 13.

Figure 1A:
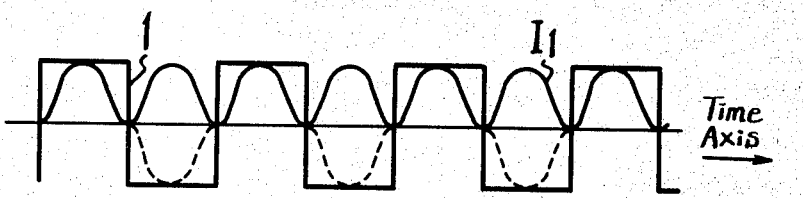
FIGS. 1A and 1B are waveform diagrams illustrating the relationship between the drive signals used for energizing the windings and the changing magnetic flux generated by the permanent magnet poles during rotation of the rotor.
Figure 1B:
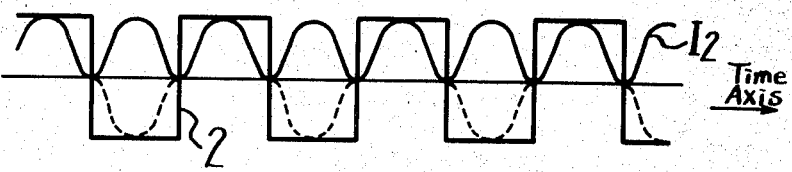
Figure 7:
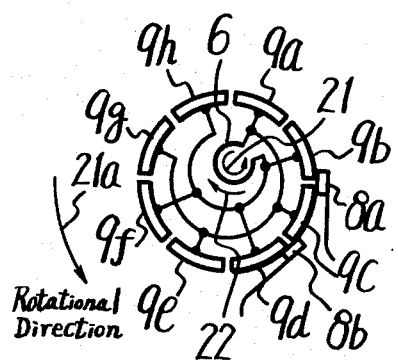
FIG. 7 is a schematic plan view of a commutator-brush arrangement that can be used with one of the windings of the DC motor of FIG. 2.

Accordingly, currents $I_1$ and $I_2$ proportional to $\sin^2 \theta$ and $\cos^2 \theta$, respectively, are produced as illustrated in FIGS. 1A and 1B. It should be realized, however, that the direction of current flow through the windings must be alternated in order to rotate rotor 5 in one direction with a constant torque. Thus, the DC motor of FIG. 2 includes a first switching device 6P for periodically alternating the direction of current flow through winding 6 in response to the rotational position of rotor 5. Switching device 6P is comprised of a commutator section 9 fixed to shaft 3 so as to rotate with rotor 5 and a pair of stationary brushes 8 in contact with commutator section 9. In particular, as shown in FIG. 7, commutator section 9 is comprised of eight commutator pieces 9a-9h which are equivalent in number to the number of pole pieces of permanent magnet 4. All of the alternate commutator pieces 9a,9c,9e and 9g are connected in common to one end of winding 6 and the remaining alternate commutator pieces 9b,9d,9f and 9h are connected in common to the other end of winding 6. The pair of brushes 8 includes a first brush 8a connected to the output of operational amplifier 17 and a second brush 8b connected to ground with both brushes being spaced apart along commutator section 9 by an electrical angle of $N \times 180°$ where N is an odd integer. It should therefore be appreciated that when brushes 8a and 8b contact commutator pieces 9a-9h, energizing current $I_1$ flows through brushes 8a and 8b to energize winding 6. Thus, for example, when brush 8a contacts commutator piece 9a (or 9c, 9e, 9g) and brush 8b contacts commutator piece 9b (or 9d, 9f, 9h), energizing current $I_1$ flows through drive winding 6 in the direction indicated by arrow 21 in FIG. 7. As rotor 5 rotates in the direction of arrow 21a, commutator section 9 also rotates. Thus, when commutator section 9 is rotated by an electrical angle of 180°, brush 8a contacts commutator piece 9b (or 9d, 9f, 9h) and brush 8b contacts commutator piece 9c (or 9e, 9g, 9a) so that energizing current $I_1$ now flows through drive winding 6 in the direction indicated by arrow 22 opposite to the direction of arrow 21. It should readily be appreciated that the current through drive winding 6 thus has its direction switched each time that commutator section 9 is rotated by an electrical angle of 180°. In order to avoid the generation of electrical noise during such switching operation, the direction of energizing current $I_1$ is altered or switched when the level of such current flowing through drive winding 6 is substantially reduced to zero. This can more readily be seen by referring to FIG. 1A where square wave 1 represents the change in magnetic flux detected by winding 6 upon rotation of rotor 5. As shown therein, current $I_1$ is equal to zero when the magnetic flux generated by magnet 4 is changing polarity. This occurs when the coils $C_1, C_2$ of winding 6 rotate to the position of coils $C_3$ and $C_4$ on FIG. 4. Thus, when current $I_1$ has its direction of current flow changed, as when brushes 8a and 8b are in the position shown in FIG. 7, the current flow through winding 6 (and brushes 8a and 8b) is substantially equal to zero so that any electrical noise generated during such switching operation is substantially eliminated. However, even if the direction of current $I_1$ is switched at a rotational angle which deviates by an electrical angle of 10° from its desired switching position, the amplitude of the current flowing through winding 6 is only about 3% of the maximum amplitude of current $I_1$ so that any electrical noise generated at this time is negligible.

The DC motor of FIG. 2 further includes a second switching device 7P for periodically alternating the direction of current $I_2$ through winding 7 in correspondence with the rotational position of rotor 5. Switching device 7P includes a second commutator section 11 (FIG. 8) having eight commutator pieces 11a-11h also fixed to shaft 3 and in angular alignment with commutator pieces 9a-9b. Although not shown in FIG. 8, the connections of commutator pieces 11a-11h are identical to those of FIG. 7 with commutator pieces 11a, 11c, 11e and 11g being connected in common to one end of second winding 7 and the remaining alternate commutator pieces 11b, 11d, 11f and 11h being connected in common to the other end of second drive winding 7. Also, second switching device 7P includes a pair of brushes 10 comprised of a first brush 10a and a second brush 10b with brushes 10a and 10b being separated from one another by an electrical angle of $N \times 180°$ where N is an odd integer so as to alternately contact commutator pieces 11a-11h as rotor 5 is rotated. Thus, second switching device 7P acts to alternately switch the direction of energizing current $I_2$ through second drive winding 7 during each rotation of rotor 5 by an electrical angle of 180° in the same manner as the previously discussed brushes 8a and 8b.

Figure 8:
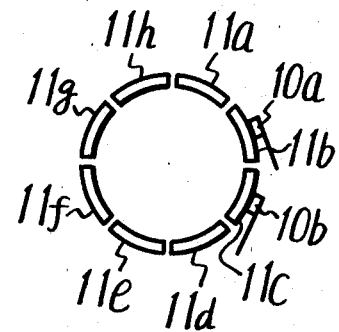
FIG. 8 is a schematic plan view of a commutator-brush arrangement that can be used with the other winding of the DC motor of FIG. 2.

Further, brushes 10a and 10b are spaced from brushes 8a and 8b by an electrical angle of $N \times 90°$ where N is an odd integer. This relationship is shown in FIGS. 7 and 8 where it is seen that brush 10a contacts commutator piece 11b and brush 10b contacts commutator piece 11c when brush 8a contacts both commutator pieces 9b and 9c and brush 9d contacts both commutator pieces 9c and 9d. Thus, in the configuration of FIGS. 7 and 8, current $I_1$ is substantially equal to zero at this time while current $I_2$ is at its peak value. When rotor 5 rotates an electrical angle of 90°, energizing current $I_1$ is at its peak value while energizing current $I_2$ is substantially equal to zero. It should be realized, however, that the same result may be obtained if brushes 8a and 8b are positioned with respect to brushes 10a and 10b by an electrical angle of $M \times 180°$ where M is an even integer. In such case, commutator section 9 would be angularly displaced from commutator section 11 by an electrical angle of N×90° where N is an odd integer.

It should thus be appreciated that because of such arrangement, any electrical noise during current switching is substantially eliminated, while, at the same time, a substantially constant torque with no ripple is produced, regardless of the rotational position of rotor 5. Further, since energizing currents $I_1$ and $I_2$ proportional to $\sin^2 \theta$ and $\cos^2 \theta$, respectively, are only of positive polarity, a single voltage source, such as a battery, is only required to operate the DC motor.

Figure 9:
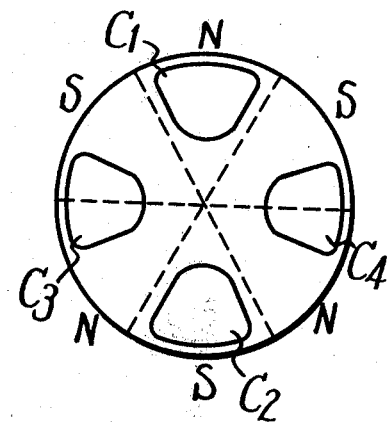
FIG. 9 is a schematic plan view illustrating another arrangement of the two-phase drive windings that can be used with the DC motor of FIG. 2.

Although the DC motor of FIG. 2 has been described as using a permanent magnet 4 having eight magnet poles, it should be apparent that any even number of poles can be used. Further, even an annular permanent magnet having three pairs of magnet poles (FIG. 9) can be used with the DC motor of FIG. 2. However, because of the symmetry involved, the polarity of the magnetic flux applied to the coils is different in a motor having a magnet with an odd number of pairs of magnet poles that it is for a motor having a magnet with an even number of pairs of magnet poles. Accordingly, coils $C_1$–$C_4$ of a motor with a magnet having an odd number of pairs of magnet poles must be connected in reverse to the same coils in the motor with the magnet having an even number of pairs of magnet poles.

Figure 10:
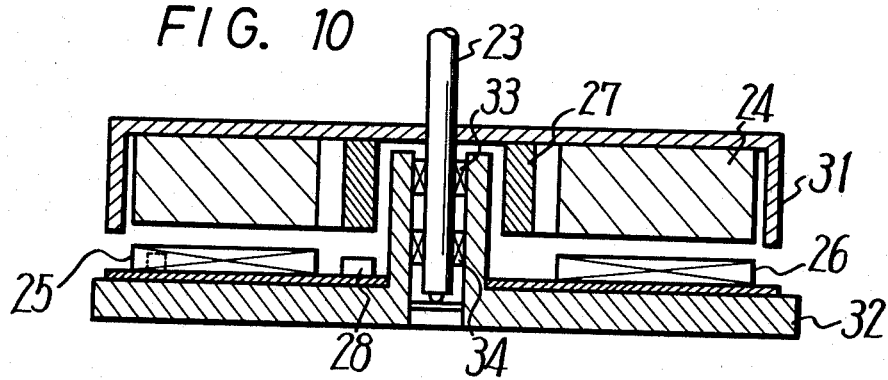
FIG. 10 is a schematic cross-sectional view of a brushless DC motor according to another embodiment of this invention.
Figure 11:
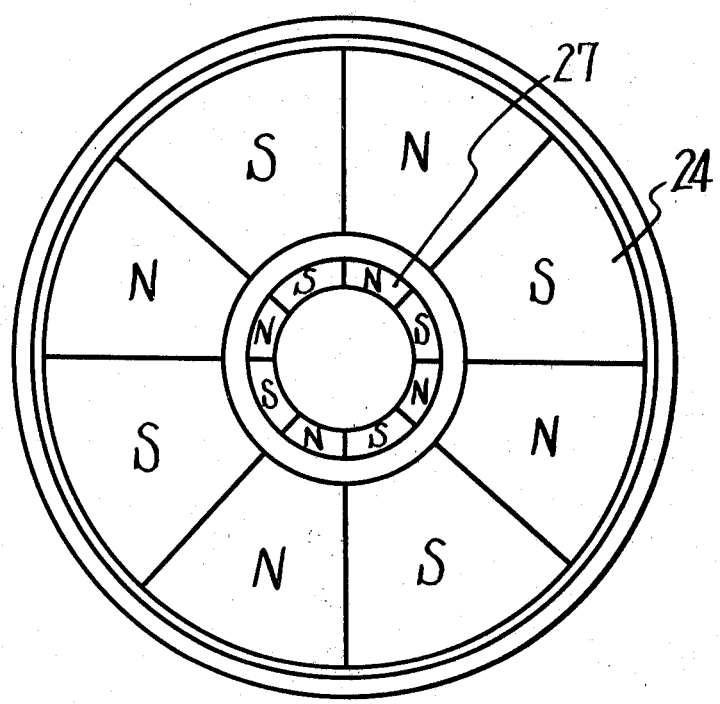
FIG. 11 is a schematic plan view of one embodiment of an annular permanent rotor magnet and a position magnet that can be used with the DC motor of FIG. 10.

Referring now to FIG. 10, there is shown therein a brushless DC motor with which the present invention finds ready application. The DC motor of FIG. 10 is again an 8-pole 2-phase DC motor having a cylindrical outer rotor 31 fixed to a rotatable shaft 23. Secured to an inner surface of rotor 31 is an annular permanent magnet 24 (FIG. 11) comprised of four pairs of permanent magnet poles pieces of opposite polarity. That is, permanent magnet 24 is comprised of four pairs of north and south magnet pole pieces, each pole piece occupying an electrical angle of 180°. Magnet 24 is magnetized to have a square wave magnetic flux distribution along a circumferential path, as was previously discussed in relation to magnet 4 of the DC motor of FIG. 2.

Figure 12:
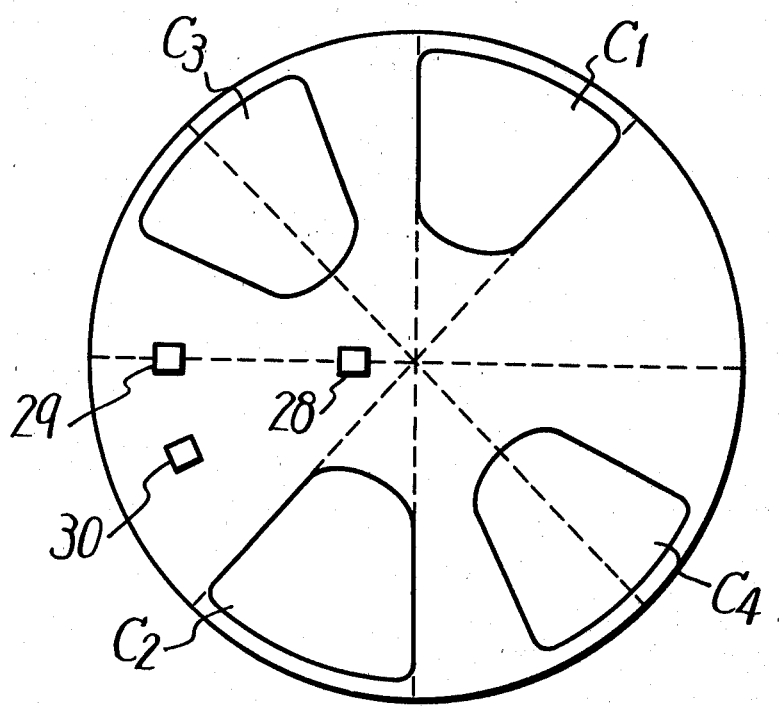
FIG. 12 is a schematic plan view illustrating one arrangement of the two-phase drive windings and Hall-effect elements that can be used in the DC motor of FIG. 10.

The DC motor further includes a non-rotatable stator 32 which is concentric with shaft 23, the latter being rotatably supported within stator 32 by bearings 33 and 34. Secured to a surface of stator 32 in facing relation to the pole pieces are first and second drive windings 25 and 26 constituted by coils $C_1,C_2$ and $C_3,C_4$, respectively (FIG. 12). Coils $C_1$ and $C_2$ are arranged in diametrically opposed relation on the surface of stator 32 so as to be spaced apart from each other by a positional angle of 180° and are connected in series so as to be electrically in phase. In like manner, coils $C_3$ and $C_4$ are likewise diametrically arranged on stator 32 and are also connected in series so as to be electrically in phase. Further, as with the DC motor of FIG. 2, first drive winding 25 and second drive winding 26 are spaced apart by an electrical angle of N×90° where N is an odd integer. In this manner, as with the DC motor of FIG. 2, when currents proportional to $\sin^2 \theta$ and $\cos^2 \theta$ are supplied to first and second drive windings 25 and 26, respectively, rotor 31 is caused to rotate by the production of a constant torque.

Further, a position magnet 27, identical to position magnet 12, is secured to rotor 31 and thus the same number of poles as permanent magnet 24. A magnetic reluctance element 28, identical to magnetic reluctance element 13, is positioned on stator 32 in opposing relation to position magnet 27 for detecting the magnetic flux generated by position magnet 27 and producing a control signal proportional to $\sin^2 \theta$.

Figure 13:
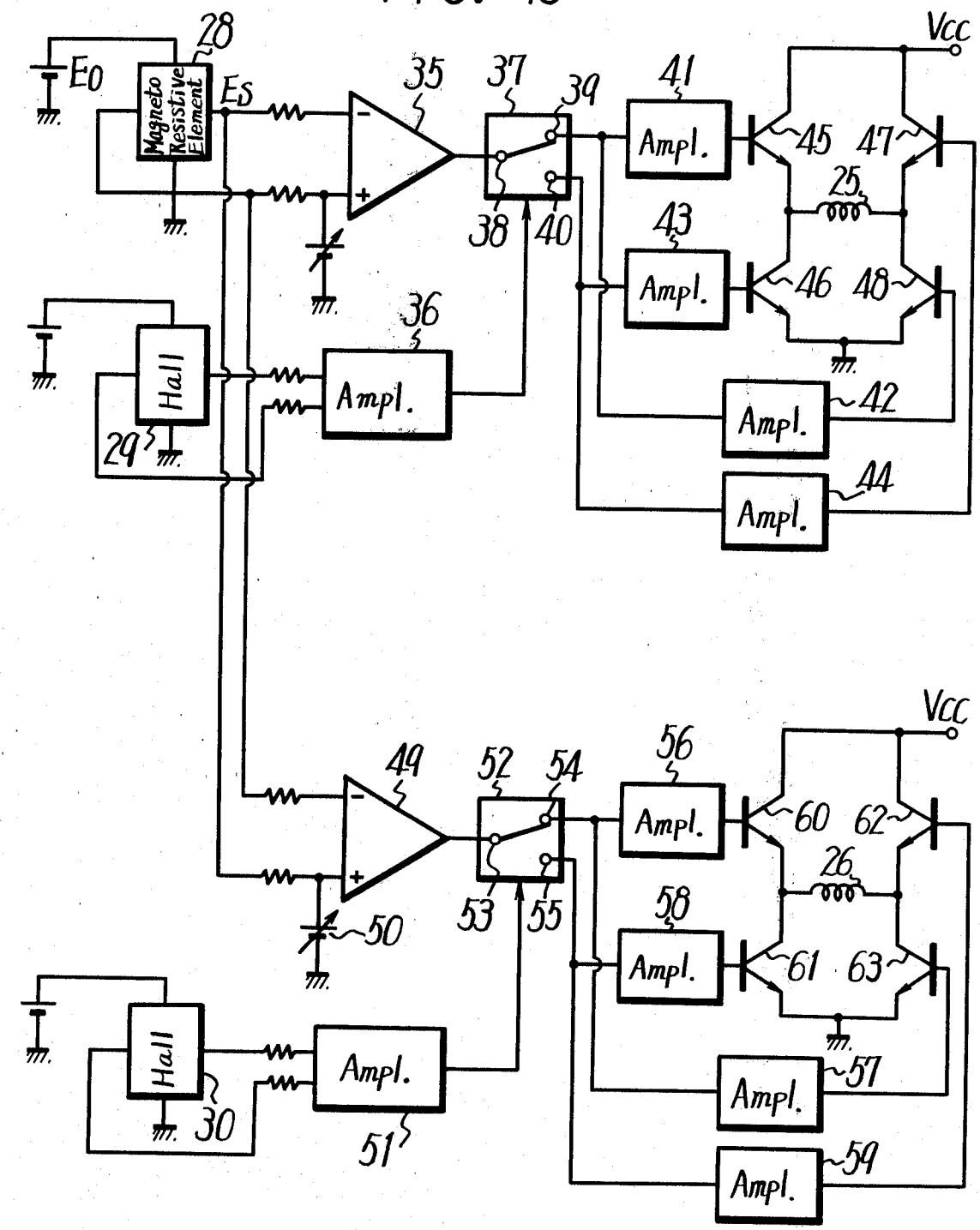
FIG. 13 is a circuit wiring-block diagram of a drive circuit for driving the DC motor of FIG. 10.

Referring now to FIG. 13, it should be appreciated that magnetic reluctance element 28, operational amplifier 35, operational amplifier 49 and voltage source 50 correspond identically in construction and operation to magnetic reluctance element 13, operational amplifier 17, operational amplifier 18 and voltage source 20, respectively, of FIG. 6. Thus, a signal proportional to $\sin^2 \theta$ (FIG. 14B) is produced at the output of operational amplifier 35 while a signal proportional to $\cos^2 \theta$ (FIG. 14E) is produced at the output of operational amplifier 49 in exactly the same manner as was previously discussed in relation to the DC motor of FIG. 2.

In order to alternate the direction of current through coils 25 and 26, a switching device shown in FIG. 13 is provided. The switching device includes first and second switches 37 and 52 for supplying the drive signals proportional to $\sin^2 \theta$, and $\cos^2 \theta$, respectively, through windings 25 and 26, respectively, with the direction of current flow through such windings being alternated in correspondence with the rotational position of rotor 31. In particular, each of switches 37 and 52 includes respective input terminals 38 and 53 and first and second output terminals 39,40 and 54,55, and a movable arm adapted to alternately connect the respective input terminals to one of the respective output terminals. It is to be realized, however, that although switches 37 and 52 are shown as single-pole double-throw switches, such switches are preferably comprised of semiconductor devices. Input terminals 38 and 53 are connected to the outputs of operational amplifiers 35 and 49, respectively. Further, first output terminals 39 and 54 are connected with windings 25 and 26, respectively, through respective first current control paths and second terminals 40 and 55 are connected with windings 25 and 26 through respective second current control paths.

More particularly, first terminal 39 of switch 37 is connected through amplifiers 41 and 42 to the bases of transistors 45 and 48, respectively. Transistor 45 has its collector-emitter path connected between a voltage source $V_{CC}$ and one end of drive winding 25 and transistor 48 has its collector-emitter path connected between the other end of drive winding 25 and ground. In like manner, second output terminal 40 of switch 37 is connected through amplifiers 43 and 44 to the bases of transistors 46 and 47, respectively, with the collector-emitter path of transistor 46 being connected between one end of drive winding 25 and ground and the collector-emitter path of transistor 47 being connected between the other end of drive winding 25 and voltage source $V_{CC}$. It is to be appreciated that transistors 45 and 48 are turned ON when input terminal 38 is connected to first output terminal 39 of switch 37 so that the drive signal proportional to $\sin^2 \theta$ is supplied to the bases of transistors 45 and 48. At this time, since transistors 45 and 48 are turned ON, a first current path is established from voltage source $V_{CC}$ to ground so that an energizing current flows through drive winding 25 in one direction. When input terminal 38 contacts second output terminal 40 of switch 37, transistors 46 and 47 are turned ON and an energizing current flows in a second current path from voltage source $V_{CC}$ to ground through drive winding 25 in the opposite direction in response to the drive signal proportional to $\sin^2 \theta$ from operational amplifier 35.

In like manner, first output terminal 54 of switch 52 is connected to the bases of transistors 60 and 63 through amplifiers 56 and 57, respectively, with the collector-emitter path of transistor 60 being connected between voltage source $V_{CC}$ and one end of drive winding 26 and the collector-emitter path of transistor 63 being connected between the other end of drive winding 26 and ground. Second output terminal 55 of switch 52 is connected to the bases of transistors 61 and 62 through amplifiers 58 and 59, respectively, with the collector-emitter path of transistor 61 being connected between one end of drive winding 26 and ground and the collector-emitter path of transistor 62 being connected between the other end of drive winding 26 and voltage source $V_{CC}$. Thus, when input terminal 53 is connected to output terminals 54 and 55, a drive signal from operational amplifier 49 proportional to $\cos^2 \theta$ is supplied through drive winding 26 with the direction of current flow therethrough being alternated in correspondence with the switching operation of switch 52.

Figure 14A:
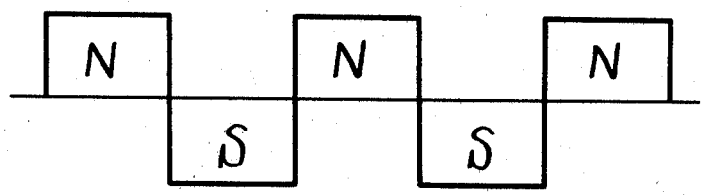
FIGS. 14A–14G are waveform diagrams used for explaining the operation of the drive circuit of FIG. 13.
Figure 14B:
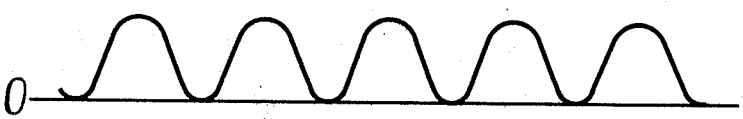
Figure 14C:
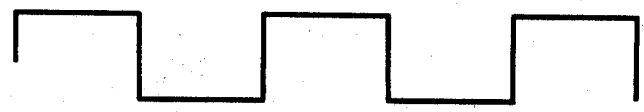
Figure 14D:
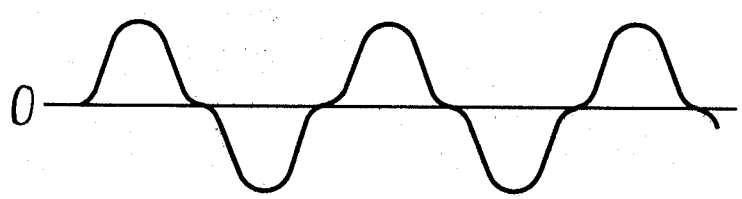
Figure 14E:
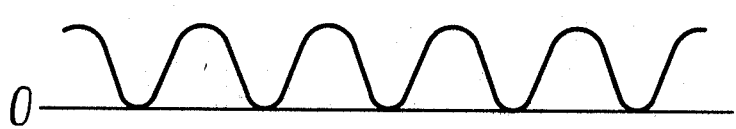

It is desirable, as with the DC motor of FIG. 2, to alternate the direction of current flow through windings 25 and 26 for each rotation of rotor 31 by an electrical angle of 180°. Therefore, a switch control device is provided for alternately connecting the input terminals of each switch 37 and 52 to the respective output terminals thereof in correspondence with the rotational position of rotor 31. The switch control device includes first and second Hall-effect elements 29 and 30 mounted on stator 32 at positions corresponding to first and second drive windings 25 and 26 and separated from one another by an electrical angle of $N \times 90°$ where N is an odd integer. The Hall-effect elements are adapted to detect the magnetic flux generated by rotor magnet 24 and produce a corresponding signal for actuating the switches. In particular, Hall-effect element 29 is supplied with a voltage from a voltage source and also with the magnetic flux generated by rotor magnet 24 and produces a signal corresponding to the change in magnetic flux as permanent magnet 24 rotates with rotor 31. That is, if permanent magnet 24 is magnetized so as to produce a magnetic flux distribution around a circumferential path thereof, as shown in FIG. 14A, Hall-effect element 29 produces a signal (FIG. 14C) corresponding to such magnetic flux distribution. This signal is supplied through an amplifier 36 to switch 37 so that for each rotation of rotor 31 by an electrical angle of 180°, input terminal 38 is alternately connected to one of output terminals 39 and 40 for causing the energizing current to flow through winding 25 in alternate directions. For example, when Hall-effect element 29 detects a north magnet pole of rotor magnet 24, Hall-effect element 29 produces a signal which is supplied through amplifier 36 to connect input terminal 38 with first output terminal 39, as shown in FIG. 13. At this time, the drive signal proportional to $\sin^2 \theta$ from operational amplifier 35 is supplied through terminals 38 and 39 of switch 37 and amplifiers 41 and 42 to turn ON transistors 45 and 48. A drive current proportional to $\sin^2 \theta$ thereby energizes winding 25 from voltage source $V_{CC}$ through transistor 45, drive winding 25 and transistor 48 to ground. When rotor magnet 24 and rotor 31 are rotated by an electrical angle of 180°, Hall-effect element 29 detects a south magnet pole of rotor magnet 24 and switch circuit 37 is activated to connect input terminal 38 to output terminal 40. At this time, the drive signal proportional to $\sin^2 \theta$ from operational amplifier 35 is supplied through terminals 38 and 40 and amplifiers 43 and 44 to turn transistors 46 and 47 ON. Thus, a drive current proportional to $\sin^2 \theta$ flows from voltage source $V_{CC}$ through transistor 47, drive winding 25 and transistor 46 to ground in a direction opposite to the direction when Hall-effect element 29 detects a north magnet pole of rotor magnet 24. Accordingly, a composite energizing current proportional to $\sin^2 \theta$ flows through drive winding 25, as shown in FIG. 14D.

Figure 14F:
Figure 14G:
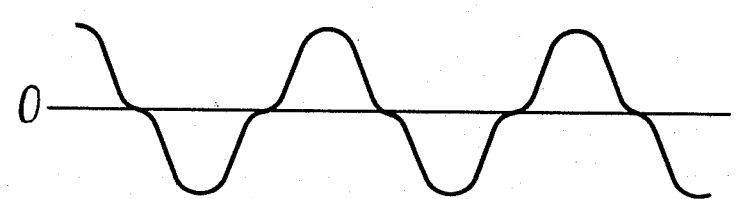

In like manner, Hall-effect element 30 produces a signal (FIG. 14F) corresponding to the magnetic flux distribution of rotor magnet 24 and which signal is 90° out of phase with the signal (FIG. 14C) produced by Hall-effect element 29. This signal from Hall-effect element 30 is supplied through an amplifier 51 to switch 52 which supplies the drive signal proportional to $\cos^2 \theta$ (FIG. 14E) to control transistors 60–63 so that the direction of energizing current through drive winding 26 is alternated in correspondence with the rotational position of rotor 31 in much the same manner as the previously-described operation of drive winding 25. For example, when Hall-effect element 30 detects a north magnet pole of rotor magnet 24, input terminal 53 is connected to output terminal 54 of switch 52 to supply the drive signal proportional to $\cos^2 \theta$ to the bases of transistors 60 and 63 through amplifiers 56 and 57, respectively, to turn these transistors ON. Therefore, a drive current proportional to $\cos^2 \theta$ flows from voltage source $V_{CC}$ through transistor 60, second drive winding 26 and transistor 63 to ground. When Hall-effect element 30 detects a south magnet pole of rotor magnet 24, input terminal 53 is connected to output terminal 55 and the drive signal from operational amplifier 49 proportional to $\cos^2 \theta$ acts to turn ON transistor 61 and 62 whereby an energizing current proportional to $\cos^2 \theta$ is supplied from voltage source $V_{CC}$ through transistor 62, drive coil 26 and transistor 61 to ground in a direction opposite to the direction when Hall-effect element 30 detects a north magnet pole of rotor magnet 24. Accordingly, a composite energizing current proportional to $\cos^2 \theta$ (FIG. 14G) is generated to energize drive winding 26. Since the enrgizing currents supplied through drive windings 25 and 26 are 90° out of phase, a substantially constant torque with no ripple is generated regardless of the rotational position of rotor 31.

It is to be realized that, in place of Hall-effect elements 29 and 30, magnetic reluctance elements may be used for similarly controlling the directions of the energizing currents to windings 25 and 26. Alternatively, an optical detecting system may be used in which reflecting and non-reflecting sections are provided on one of the stator and rotor in correspondence with the polarity of rotor magnet 24 and an optical sensing element may be used to detect such reflecting and non-reflecting sections. Also, although the drive signal proportional to $\cos^2 \theta$ has been derived by using the relationship $\cos^2 \theta = 1 - \sin^2 \theta$, any other suitable relationship may be used. For example, the relationship $\cos^2 \theta = \frac{1}{2} (\cos 2\theta + 1)$ and $\sin^2 \theta = \frac{1}{2} (1 - \cos 2\theta)$ could be used. In such case, the position magnet would necessarily require twice the number of poles as that of the permanent drive magnet. A Hall-effect element would then be used to detect a sinusoidal magnetic flux from the position magnet and produce a signal proportional to $\cos 2\theta$. The DC level of this signal would then be shifted to produce a signal proportional to $\cos^2 \theta$ by the relationship $\cos^2 \theta = \frac{1}{2} (\cos 2\theta + 1)$. In order to produce the drive signal proportional to $\sin^2 \theta$, the signal from the Hall-effect element would have its polarity inverted and the DC level thereof shifted in accordance with the relationship $\sin^2 \theta = \frac{1}{2} (1 - \cos 2\theta)$.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A DC motor comprising:
a stator;
a rotor adapted to rotate about an axis with respect to said stator;
at least two windings included in one of said stator and rotor;
flux generating means included in the other of said stator and rotors and providing a magnetic field which is of substantially constant strength regardless of the rotational position of said rotor;
means for producing first and second drive signals proportional to $\sin^2 \theta$ and $\cos^2 \theta$, respectively, where $\theta$ is an angle corresponding to said rotational position of said rotor; and
means for energizing said at least two windings in response to said first and second drive signals, respectively, with the direction of current through said at least two windings being alternated in correspondence with the rotational position of said rotor so as to rotate said rotor about said axis.

2. A DC motor according to claim 1; in which said flux generating means includes at least one pair of permanent magnet poles of opposite polarity and each providing substantially no magnetic flux variation over the respective angular extent, and in which each said winding includes at least one coil.

3. A DC motor according to claim 2; in which said DC motor is of the commutator type wherein said stator includes said at least one pair of permanent magnet poles and said rotor includes said at least two windings.

4. A DC motor according to claim 3; in which said means for energizing includes commutator means connected to said at least two windings and brush means adapted to contact said commutator means for supplying said drive signals to said commutator means whereby the direction of current through said at least two windings is alternated in correspondence with the rotational position of said rotor.

5. A DC motor according to claim 4; in which said commutator means includes a plurality of commutator sections equal in number to the number of windings, each commutator section including a plurality of commutator pieces adapted to rotate about said axis with said rotor, and said brush means includes a plurality of pairs of brush members equal in number to the number of commutator sections, each mounted on said stator in contact with the commutator pieces of a respective one of said commutator sections, whereby each of said pairs of brushes perodically contacts respective ones of said commutator pieces as said commutator pieces rotate about said axis so as to alternate the direction of said current through said at least two windings in correspondence with the rotational position of said rotor.

6. A DC motor according to claim 5; in which the number of commutator pieces of each commutator section is equal to the number of permanent magnet poles, and one brush member of each pair is connected to said means for producing drive signals and the other brush member of each pair is connected to a reference potential.

7. A DC motor according to claim 2; in which said means for producing drive signals includes position magnet means mounted on one of said stator and rotor for generating a magnetic flux corresponding to the rotational position of said rotor relative to said stator, and magnetic reluctance means mounted on the other of said stator and rotor for producing a control signal proportional to $\sin^2 \theta$ in response to said generated magnetic flux.

8. A DC motor according to claim 7; in which said position magnet means is mounted with said at least one pair of permanent magnet poles on one of said stator and rotor, said position magnet means including a plurality of permanent magnet poles of equal number and polarity to that of the poles of said at least one pair of permanent magnet poles, wherein the magnetic flux generated by said position magnet means is of a sinusoidal waveform.

9. A DC motor according to claim 7; in which said means for producing drive signals includes first amplifier means for producing said drive signal proportional to $\sin^2 \theta$ in response to said control signal and second amplifier means for producing said drive signal proportional to $\cos^2 \theta$ in response to said control signal.

10. A DC motor comprising:
a stator;
a rotor adapted to rotate about an axis with respect to said stator;
at least two windings included in one of said stator and rotor, each said winding including at least one coil;
flux generating means included in the other of said stator and rotor and including at least one pair of permanent magnet poles of opposite polarity;
means for for producing drive signals proportional to $\sin^2 \theta$ and $\cos^2 \theta$, respectively, where $\theta$ is an angle corresponding to the rotational position of said rotor, said means for producing drive signals including position magnet means mounted on one of said stator and rotor for generating a magnetic flux corresponding to the rotational position of said rotor relative to said stator, magnetic reluctance means mounted on the other of said stator and rotor for producing a control signal proportional to $\sin^2 \theta$ in response to said generated magnetic flux, first amplifier means including a first amplifier for producing said drive signal proportional to $\sin^2 \theta$ in response to said control signal, and second amplifier means including means for producing a reference signal, means for inverting said control signal and a second amplifier for producing said drive signal proportional to $\cos^2 \theta$ in response to said inverted control signal and said reference signal; and
means for energizing said at least two windings in response to said drive signals with the direction of current through said at least two windings being alternated in correspondence with the rotational position of said rotor so as to rotate said rotor about said axis.

11. A DC motor according to claim 2; in which said means for energizing includes switch means for alternating the direction of current through said at least two windings and switch control means for controlling said switch means to alternate the direction of current through said at least two windings in correspondence with the rotational position of said rotor.

12. A DC motor according to claim 11; in which said switch means includes first and second switches, each having first and second output terminals and an input terminal alternately connected with said output terminals, the input terminal of said first switch being supplied with said drive signal proportional to $\sin^2 \theta$ and the input terminal of said second switch being supplied with said drive signal proportional to $\cos^2 \theta$, and first and second control paths for supplying an energizing current in one direction to first and second windings of said at least two windings, respectively, in response to said drive signals proportional to $\sin^2 \theta$ and $\cos^2 \theta$, respectively, and third and fourth control paths for supplying an energizing current in the opposite direction to said first and second windings, respectively, in response to said drive signals proportional to $\sin^2 \theta$ and $\cos^2 \theta$, respectively.

13. A DC motor according to claim 12; in which each of said control paths includes a pair of transistors each having a collector-emitter path, the collector-emitter path of one transistor of each pair being connected between one end of one of said at least two windings and a first reference potential and the collector-emitter path of the other transistor of each pair being connected between the other end of said one of said at least two windings and a second reference potential, the collector-emitter path of said one transistor of each pair of transistors included in said first and third control paths being connected to opposite ends of said first winding and the collector-emitter path of said one transistor of each pair of transistors included in said second and fourth control paths being connected to opposite ends of said second winding.

14. A DC motor according to claim 12; in which both transistors of the pairs thereof included in said first and third control paths, respectively, are adapted to be turned ON in response to said drive signal proportional to $\sin^2 \theta$ from said first and second output terminals of said first switch, respectively, and both transistors of the pairs thereof included in said second and fourth control paths, respectively, are adapted to be turned ON in response to said drive current proportional to $\cos^2 \theta$ from said first and second output terminals of said second switch, respectively.

15. A DC motor according to claim 12; in which said switch means further includes switch control means for alternately connecting said input terminal of each of said switches to said respective output terminals in correspondence with the rotational position of said rotor.

16. A DC motor according to claim 15; in which said switch control means includes at least two Hall-effect elements mounted on one of said stator and rotor and separated thereon by an electrical angle corresponding to the electrical angle separation of said at least two windings for producing switch control signals corresponding to the rotational position of the rotor relative to the stator, and wherein said switch control signals actuate said first and second switches to alternate the direction of current flow through said first and second windings.

17. A DC motor according to claim 2; in which said DC motor is of the brushless type with said stator including said at least two windings and said rotor including said at least one permanent magnet.

18. A DC motor according to claim 2; in which the direction of current through said windings is alternated at rotational positions of said rotor when said drive signals are substantially equal to zero.

19. A DC motor according to claim 2; in which said at least two windings are comprised of first and second windings separated by an electrical angle of 90° with said first winding being energized in response to said drive signal proportional to $\sin^2 \theta$ and said second winding being energized in response to said drive signal proportional to $\cos^2 \theta$.

* * * * *